US009691002B2

(12) United States Patent
Tomlinson et al.

(10) Patent No.: US 9,691,002 B2
(45) Date of Patent: *Jun. 27, 2017

(54) SYSTEM AND METHOD OF ADJUSTING THE COLOR OF IMAGE OBJECTS BASED ON CHAINED REFERENCE POINTS, GRADIENT CHARACTERIZATION, AND PRE-STORED INDICATORS OF ENVIRONMENTAL LIGHTING CONDITIONS

(71) Applicant: CARBON OBJECTS, INC., Chattanooga, TN (US)

(72) Inventors: Allen Reed Tomlinson, Chattanooga, TN (US); Frances Allie O'Connell, Chattanooga, TN (US)

(73) Assignee: Carbon Objects, Inc., Chattanooga, TN (US)

(*) Notice: Subject to any disclaimer, the term of this patent is extended or adjusted under 35 U.S.C. 154(b) by 0 days.

This patent is subject to a terminal disclaimer.

(21) Appl. No.: 14/954,979

(22) Filed: Nov. 30, 2015

(65) Prior Publication Data
US 2016/0117568 A1 Apr. 28, 2016

Related U.S. Application Data

(63) Continuation of application No. 14/592,618, filed on Jan. 8, 2015, now Pat. No. 9,204,018.
(Continued)

(51) Int. Cl.
G06K 9/00 (2006.01)
G06K 9/46 (2006.01)
(Continued)

(52) U.S. Cl.
CPC .......... *G06K 9/4661* (2013.01); *G06K 9/4652* (2013.01); *G06K 9/6215* (2013.01);
(Continued)

(58) Field of Classification Search
CPC .......... G06T 5/008; G06T 2207/10024; G06T 2207/302; H04N 1/6091; G01J 3/46;
(Continued)

(56) References Cited

U.S. PATENT DOCUMENTS 5,272,518 A * 12/1993 Vincent ............... G01J 3/12
250/226
6,732,119 B2 5/2004 Ganapathy et al. ....... 707/104
(Continued)

*Primary Examiner* — Mekonen Bekele
(74) *Attorney, Agent, or Firm* — Sheppard Mullin Richter & Hampton LLP

(57) ABSTRACT

The invention relates to a system and method for adjusting the color of image objects based on chained reference points and/or light gradients to account for the effects of lighting conditions that can vary across different environments, according to an implementation of the invention. To chain reference points and/or characterize light gradients, the system may determine a color shift value, which represents the effects of lighting conditions of a target environment (in which the lighting conditions may be unknown) relative to a reference environment (in which the lighting conditions may be known). The chained reference points, gradient characterization, color shift values, and/or other information may be used to store a delta map that characterizes the lighting conditions of an environment so that it may be reused for subsequent color shifts without re-characterizing the environment.

26 Claims, 7 Drawing Sheets

Related U.S. Application Data

(60) Provisional application No. 61/929,737, filed on Jan. 21, 2014.

(51) Int. Cl.
*H04N 1/60* (2006.01)
*G06T 5/00* (2006.01)
*G06K 9/62* (2006.01)
*G06T 7/73* (2017.01)
*G06T 7/246* (2017.01)
*G06T 7/90* (2017.01)

(52) U.S. Cl.
CPC .............. *G06T 5/008* (2013.01); *G06T 7/246* (2017.01); *G06T 7/74* (2017.01); *G06T 7/90* (2017.01); *H04N 1/6077* (2013.01); *H04N 1/6091* (2013.01); *G06T 2207/10024* (2013.01); *G06T 2207/30204* (2013.01)

(58) Field of Classification Search
CPC .. G01J 3/465; G01J 3/526; G01J 3/463; G01J 3/528; G09G 5/02; H05B 33/08
USPC .......... 382/162, 167, 164, 170; 358/1.9, 2.1; 345/581
See application file for complete search history.

(56) References Cited

U.S. PATENT DOCUMENTS

| | | | |
|---|---|---|---|
| 7,555,160 B2* | 6/2009 | Luo ........................ | G01J 3/46 358/1.9 |
| 8,427,473 B2 | 4/2013 | Elsberg et al. ............ | 345/420 |
| 8,526,718 B2 | 9/2013 | Rao ........................ | 382/162 |
| 8,654,120 B2 | 2/2014 | Beaver, III et al. ........ | 345/419 |
| 8,683,387 B2 | 3/2014 | Densham ................. | 715/849 |
| 9,204,018 B2* | 12/2015 | Tomlinson ........... | H04N 1/6077 |
| 2001/0053249 A1* | 12/2001 | Krishnamachari . | G06F 17/3025 382/165 |
| 2004/0056965 A1 | 3/2004 | Bevans et al. ............ | 348/222.1 |
| 2007/0058185 A1* | 3/2007 | Kawai ................... | H04N 1/644 358/1.9 |
| 2009/0128649 A1* | 5/2009 | Osorio ................ | H04N 1/6033 348/222.1 |
| 2010/0257252 A1 | 10/2010 | Dougherty et al. ........ | 709/217 |
| 2011/0216179 A1 | 9/2011 | Dialameh et al. .......... | 348/62 |
| 2011/0219339 A1 | 9/2011 | Densham ................. | 715/849 |
| 2013/0177216 A1* | 7/2013 | Shuster .................... | G06K 9/62 382/111 |
| 2013/0300761 A1* | 11/2013 | Ahmed .................. | G01J 3/463 345/595 |
| 2015/0207960 A1* | 7/2015 | Tomlinson ........... | H04N 1/6077 382/167 |

* cited by examiner

SYSTEM AND METHOD OF ADJUSTING THE COLOR OF IMAGE OBJECTS BASED ON CHAINED REFERENCE POINTS, GRADIENT CHARACTERIZATION, AND PRE-STORED INDICATORS OF ENVIRONMENTAL LIGHTING CONDITIONS

RELATED APPLICATIONS

This application is a continuation of U.S. patent application Ser. No. 14/592,618 filed Jan. 8, 2015 entitled "System and Method of Adjusting the Color of Image Objects Based on Chained Reference Points, Gradient Characterization, and Pre-stored Indicators of Environmental Lighting Conditions", which claims priority to U.S. Provisional Patent Application No. 61/929,737, filed on Jan. 21, 2014, the entireties of which are incorporated by reference herein.

FIELD OF THE INVENTION

The invention relates to systems and methods for adjusting the color of image objects using color shift values based on chained reference points, color gradient characterization, and/or delta maps that indicate the effects of environmental lighting conditions to account for the effects of lighting conditions that can vary across different environments.

BACKGROUND OF THE INVENTION

The effects of lighting conditions of an environment impacts the manner in which an object such as artwork, furniture, and/or other objects that include color appears in the environment. As a result, an object may look different (e.g., have a different color) depending on the environment in which it is placed. Furthermore, an object may even look different depending on a location within an environment in which it is placed, because one location within the environment may be affected by lighting conditions that are different than lighting conditions that affect another location within the environment.

Use of a marker having known color characteristics can help to understand the effects of lighting conditions of an environment in which the marker is placed. However, if the marker is placed in an environment having different lighting conditions in different locations, the marker would have to be placed in each of those locations, which may not be feasible.

These and other drawbacks exist.

SUMMARY OF THE INVENTION

The invention addressing these and other drawbacks relates to systems and methods for adjusting the color of image objects based on chained reference points and/or light gradients to account for the effects of lighting conditions that can vary across different environments, according to an implementation of the invention. To chain reference points and/or characterize light gradients, the system may determine a color shift value, which represents the effects of lighting conditions of a target environment (in which the lighting conditions may be unknown) relative to a reference environment (in which the lighting conditions may be known).

The system may determine a color shift value based on a marker, which may include an object having known color characteristics in the reference environment. For example, a reference image object may be created that includes a marker imaged in a reference environment. The system may obtain a target image object that includes the marker imaged in a target environment. For illustration and not limitation, the reference environment will be described as an art gallery and the target environment will be described as a user's home for convenience, although other environments may be used as well.

The system may determine a first set of color characteristics of the target image object and compare the first set of color characteristics with the known color characteristics. The system may determine a color shift value based on a difference between the first set of color characteristics and the known color characteristics. The color shift value may therefore represent a difference in lighting conditions of a target environment relative to a reference environment.

Generally speaking, the system may apply a color shift value to an image object to remove the effects of lighting conditions of a target environment to generate an illuminant invariant image object. For example, the system may remove the effects of lighting conditions of an environment from an image object by shifting the color of the image object based on a color shift value. In this manner, the system may create an illuminant invariant image object relative to the reference environment. In other words, the illuminant invariant image object represents an image object that is predicted to result if an object imaged in the image object were removed from the target environment and placed in the reference environment.

Further generally speaking, the system may apply a color shift value to simulate the effects of a target environment on an illuminant invariant image object. For example, the system may add the effects of lighting conditions of a target environment to the illuminant invariant object by shifting the color of the illuminant invariant image object based on the color shift value. In this manner, the system may generate a simulated image object that represents an image object predicted to result if an object imaged in the illuminant invariant image object were removed from the reference environment and placed in the target environment.

Using color shift values as described herein, the system may chain reference points, characterize a light gradient, generate delta maps, and/or perform other functions to shift the color of image objects.

Determining Chained Reference Points

In an implementation, the system may chain together reference points in an image of an environment in order to determine and apply color shift values associated with various locations in the environment, starting with a reference point whose color shift value is already known for a first location (e.g., based on a marker as described above).

In instances where a second marker is unavailable for a second location of the environment having a different set of lighting conditions than the first location, the system may identify a second reference point that is associated with both the first and second locations, whether or not a color characteristic is known about the second reference point. For example, the system may identify a wall of a room that spans the first and second locations of the room, where each of the first and second locations are affected by different lighting conditions. The system may apply the first color shift value to the second reference point (e.g., the wall) to remove the effects of the lighting conditions at the first location to generate an illuminant invariant of the second reference point.

In the foregoing example, the system may determine an absolute color of the wall that excludes the effects of the lighting conditions at the first location. Using the wall color as a second marker (because its color after application of the first color shift value is now an illuminant invariant), the system may determine a second color shift value that represents the effects of the lighting conditions at the second location of the room (e.g., any differences between the illuminant invariant image of the wall and the image of the wall at the second location represents the effects of the lighting conditions at the second location). The system may apply the second color shift value to a given object. The system may also use the second marker to generate a third marker, and so on.

In this manner, the system may determine and apply color shift values for an image associated with multiple lighting conditions, so long as at least one marker is available for at least one of the lighting conditions and so long as a common object exists across any two given locations having different lighting conditions. Using the system, a user may determine how artwork would look under different lighting conditions of the user's home (or other environment having different lighting conditions). For example, the system may facilitate viewing an image object at different positions in a scene associated with different lighting conditions such as in a panoramic scene, a virtual reality scene, and/or other types of scenes even if a marker is initially available only at a first portion of the scene associated with a set of lighting conditions that are different than in other portions of the scene.

Characterizing Gradients

In an implementation, the system may characterize a light gradient associated with an environment. A light gradient may include lighting intensities (e.g., from light emitted from one or more light sources) and therefore corresponding lighting conditions that vary in an environment. For example, a first location in the environment may be associated with a first lighting intensity and corresponding first lighting effect and a second location in the environment may be associated with a second lighting intensity and corresponding second lighting effect.

The system may characterize the light gradient by sampling individual reference points associated with at least one known marker in the environment. Based on the sampled reference points, the system may determine the light gradient associated with those sampled reference points. In some implementations, the system may extrapolate other portions of, or the entire, light gradient based on the sampled reference points. The system may remove the characterized light gradient (whether based on sampled reference points or extrapolated from the sampled reference points) from an image object in an image to create an illuminant invariant image object. The system may also add lighting effects corresponding to the light gradient to an illuminant invariant image object to simulate the effects of the light gradient depending on the position in which the illuminant invariant image object is placed in the image. It is noted that a position in an image corresponds to a location in an environment that is represented (e.g., imaged) by the image.

Delta Maps

In an implementation, the system may store a delta map in association with a corresponding environment. A delta map is a set of color shift values that each: indicates a difference in color observed from an object imaged under lighting conditions of a reference environment and under lighting conditions of a target environment. Thus, the delta map may be used to characterize the lighting conditions of a target environment (e.g., a user's home) relative to the reference environment (e.g., a gallery). The set of color shift values may convey the effects of lighting conditions over different locations in a given environment. In a particular example, the system may store a delta map for a room in a user's home in association with an identifier that identifies the user's room. In this manner, the system may, at later times, recall the delta map for the user's room in order to remove the effects of the lighting conditions from objects imaged in the user's room or to simulate the effects of the lighting conditions at one or more locations of the user's room to an image object.

In an implementation, the system may store metadata in association with a delta map. The metadata may include information that indicates conditions that may affect color shift values. For example, the conditions may include a time of day, day of week, week of month, month of year, season, device used to capture an image, device used to visualize an image, and/or other information that may affect a perception or visualization of an image. In this implementation, a delta map generated based on information obtained during evening hours may have different color shift values than a delta map generated based on information obtained during morning hours because the lighting conditions may have changed from morning to evening. Likewise, a delta map generated based on an image obtained using a first camera may have different color shift values than a delta map generated based on an image obtained using a second camera. By using the additional metadata, the system may allow for finer grain control for image simulation, as well as provide greater flexibility in accounting for different conditions that may affect color shifts. For example, the system may allow a user to simulate an appearance of artwork in the user's home during the morning hours and during the evening hours.

In operation, the system may be used to simulate an appearance of image objects in an image that depicts an environment. In particular, the system may determine the effects of lighting conditions in a given environment and adjust the color of an imaged object based on such effects. The system may adjust the color of the imaged object to simulate the lighting conditions on the imaged object as if the imaged object were placed in the given environment. In this manner, the imaged object whose color has been adjusted may be simulated to appear in the given environment.

For example, an art gallery may provide the system with images of artwork associated with known lighting conditions. The art gallery may provide the system with images created by the art gallery under known, gallery lighting conditions. Alternatively, the art gallery may provide images of artwork from artists created in their own environments that were normalized to the known, gallery lighting conditions using a marker associated with the received images. Using the system, the art gallery may normalize the images to the known, gallery lighting conditions (e.g., by removing the effects of lighting conditions in the artists' environments using a marker as described herein) to create images of artwork as the artwork would appear under the known, gallery lighting conditions.

The gallery may also provide the system with an image of a marker associated with known lighting conditions. The system may provide the user with the marker so that the user can take an image of the marker in the user's environment and provide the image to the system. In this manner, the system may determine a color shift value based on the marker that represents a difference in lighting conditions at the gallery and at the user's environment. Other markers (e.g., not provided by the system) whose color characteristics are known (e.g., a particular brand and color of paint) may be used as well.

The system may apply a color shift value associated with a user's environment to image objects, which include an image of artwork, provided by the art gallery so that the user may visualize how the artwork would appear in the user's environment.

The system may use the marker to chain reference points within the user's environment, characterize light gradients, and/or create delta maps associated with the user's environment. In this manner, the user may move the image object to various portions of an image to visualize how the artwork would appear in various locations of the user's environment, taking into account the different lighting conditions of the various locations.

Likewise, a system may determine the effects of lighting conditions in a given environment so that the color of an imaged object in an image may be adjusted to remove the effects of the lighting conditions from the imaged object to create an illuminant invariant image object. For example, the art gallery may remove the effects of lighting conditions of an artist's environment so that an image object provided by the artist may be color shifted to appear as if the artwork imaged by the image object appears to have been taken at the art gallery under known, gallery lighting conditions.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

Figure 1:
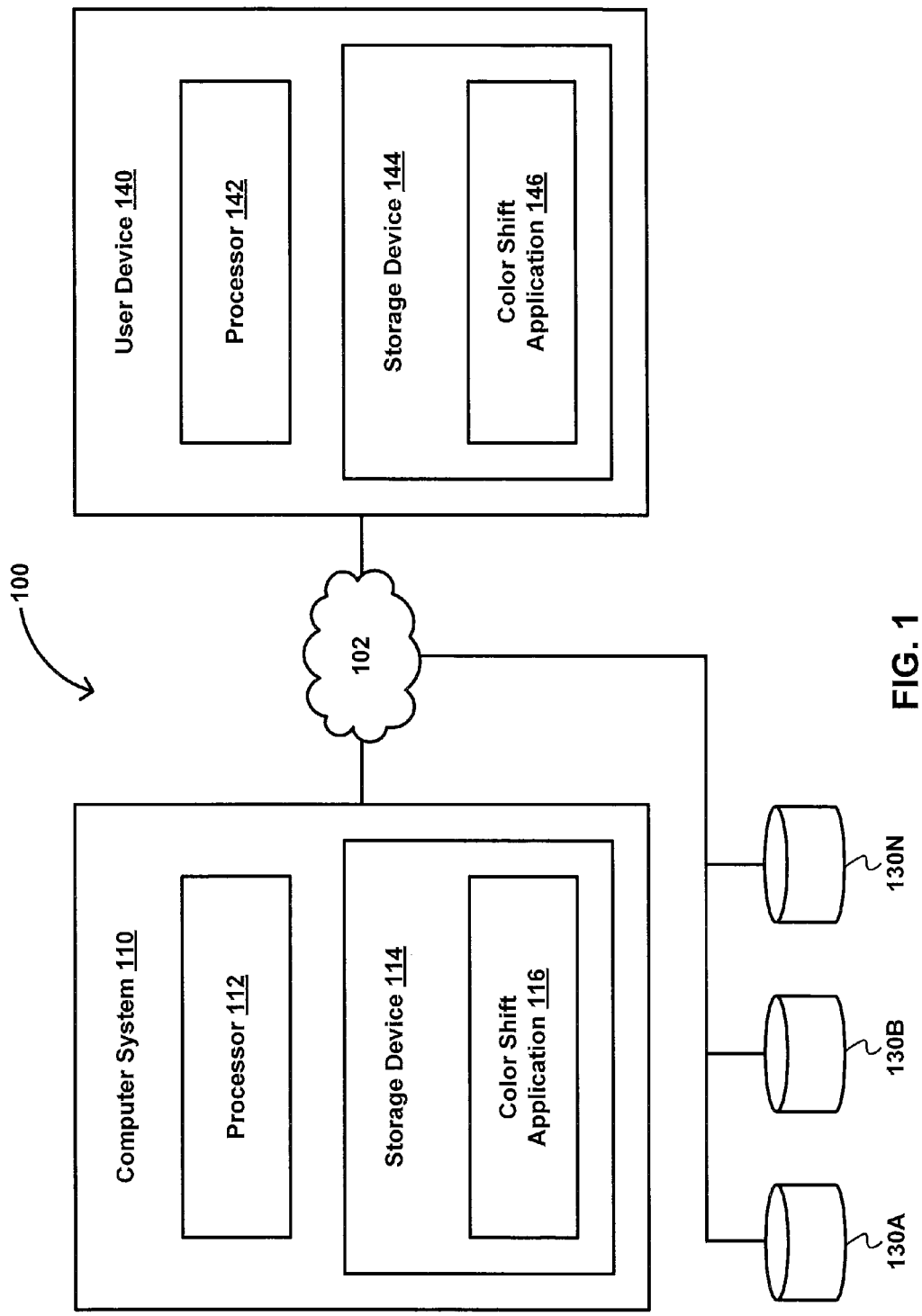
FIG. 1 illustrates a system for determining and applying color shifts to an object in an image of an environment having unknown lighting conditions using chained reference points and color gradient characterization, according to an implementation of the invention.

FIG. 1 illustrates a system 100 for adjusting the color of image objects based on chained reference points and/or color gradients, according to an implementation of the invention. As used herein, the term "image object" may include a representation of an object used to represent and recreate one or more color characteristics (e.g., a value measured in any color space (e.g., a red-green-blue ("RGB") color value, a cyan-magenta-yellow-black ("CMYK") value, a color-opponent dimensions "b" and "b" in CIE lab, etc.), an intensity, a hue, a saturation, and etc.) of an object. An "image" (e.g., a photograph, video, etc.) may include one or more image objects. For illustration and not limitation, the object will be described as artwork (e.g., a painting, a print, a photograph, sculpture, etc.) that may be imaged in different environments and therefore may appear to have different colors depending on the lighting conditions of the environment in which the artwork is placed. However, other objects (e.g., furniture, apparel, cosmetics, color swatches, etc.) may be represented as an image object as well.

In an implementation, system 100 may determine a color shift value that represents the effects of lighting conditions of a target environment (in which the lighting conditions may be unknown) relative to a reference environment (in which the lighting conditions may be known). Using color shift values as described herein, system 100 may chain reference points, characterize a light gradient, generate delta maps, and/or perform other functions to shift the color of image objects.

By chaining reference points, system 100 may account for different sets of lighting conditions that may exist in given environment even though a marker is available in only a single location of the given environment having a first set of lighting conditions. Chaining reference points allows system 100 to use the available marker to use a reference point in second location of the given environment as a marker, so long as the reference point is coextensive with a location having a known marker and the second location. By repeating this process, system 100 may create and use new markers for multiple positions of an image, each associated with location in an environment having different lighting conditions, starting with a single known marker.

In an implementation, system 100 may characterize a light gradient associated with an environment. The system may characterize the light gradient by sampling individual reference points associated with at least one known marker in an image of the environment. Based on the sampled reference points, the system may determine the light gradient associated with those sampled reference points. In some implementations, the system may extrapolate other portions of, or the entire, light gradient based on the sampled reference points. The system may remove the characterized light gradient (whether based on sampled reference points or extrapolated from the sampled reference points) from an image object in the image to create an illuminant invariant image object. The system may also add lighting effects corresponding to the light gradient to an illuminant invariant image object to simulate the effects of the light gradient depending on the position in which the illuminant invariant image object is placed in the image.

In an implementation, system 100 may store a delta map in association with a corresponding environment. A delta map may describe the effects of lighting conditions in a given environment so that the effects of the lighting conditions may be recreated. For example, a delta map may include color shift values, a characterized light gradient, and/or other information that conveys the effects of lighting conditions over different locations in a given environment. In a particular example, the system may store a delta map for a room in a user's home in association with an identifier that identifies the user's room. In this manner, the system may, at later times, recall the delta map for the user's room in order to remove the effects of the lighting conditions from objects imaged in the user's room or to simulate the effects of the lighting conditions at one or more locations of the user's room to an image object.

System Components

Other uses of system 100 are described herein and still others will be apparent to those having skill in the art. Having described a high level overview of some of the system functions, attention will now be turned to various system components that facilitate these and other functions. System 100 may include a computer system 110, one or more databases 130, one or more user devices 140, and/or other components.

Computer System 110

Computer system 110 may include one or more processors 112, one or more storage devices 114, and/or other components. Processor(s) 112 may be programmed by one or more computer program instructions, which may be stored in storage device(s) 114. The one or more computer program instructions may include, without limitation, a color shift application 116 and/or other instructions that program computer system 110. As used herein, for convenience, the various instructions will be described as performing an operation, when, in fact, the various instructions program the processors 112 (and therefore computer system 110) to perform the operation.

Determining a Color Shift Value

In an implementation, color shift application 116 may determine a color shift value, which represents the effects of lighting conditions of a given environment, and then apply the color shift value to an image object. Color shift application 116 may determine a color shift value based on a marker having one or more known color characteristics in a reference environment. For example, the marker may include a physical object (e.g., a poster) or an electronic object for printing (e.g., print instructions, although different devices may print differently and therefore such instructions may be device-specific).

A marker may be provided by an operator of the system. For example, the system (e.g., a user working on behalf of an operator of the system) may provide the marker to an art gallery (e.g., a user working on behalf of an art gallery) and to users. The art gallery and users may each insert the provided marker in their environments, and create images of their environments for processing by the system. Alternatively, a marker may be provided by any other entity or otherwise include an object having known color characteristics. For example, color shift application 116 may recognize (through explicit identification from a user or from conventional image recognition techniques) a particular paint color from a particular paint manufacturer, a particular manufactured item, and/or other item that may be recognized and whose color characteristics are known. Information (e.g., an image, color characteristics, etc.) for these known items may be stored in an item database, such as a database 130. In this manner, color shift application 116 may recognize markers in an image, whether provided by the operator of the system and inserted into an environment for imaging by a user or whether already part of the environment.

Figure 2:
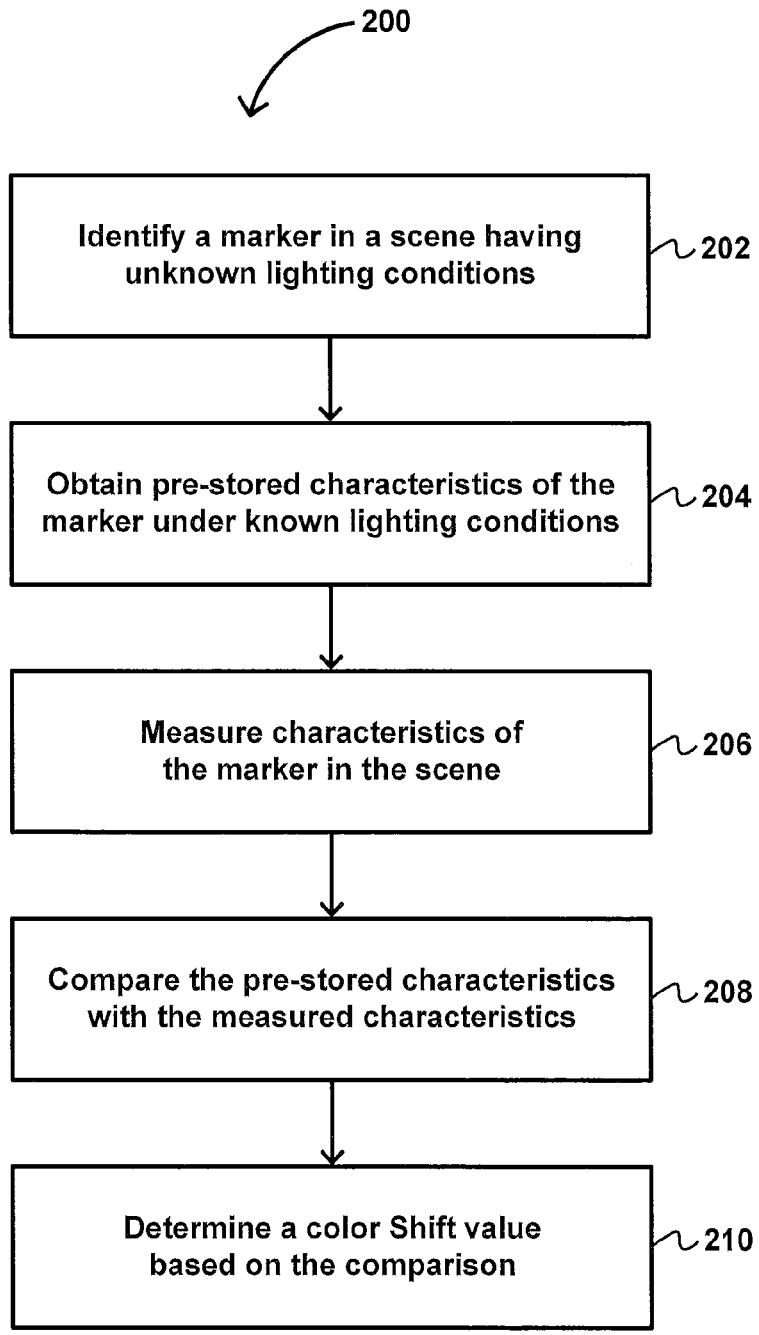
FIG. 2 illustrates a flow diagram depicting a process of determining a color shift value for a marker having known color characteristics placed in an image of an environment having unknown lighting characteristics, according to an implementation of the invention.

FIG. 2 illustrates a flow diagram depicting a process 200 of determining a color shift value for a marker having known color characteristics placed in an environment having unknown lighting characteristics, according to an implementation of the invention. The various processing operations and/or data flows depicted in FIG. 2 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 202, color shift application 116 may identify a marker in an image of a target environment. For example, the image of the target environment may be generated from inside a room of a user's home that includes the marker. The user may have obtained the marker from the system and included the marker in the room and/or a marker may be a known object already in the room. Of course, a combination of two or more markers may be used, in which case the color shift value may be calculated based on the two or more markers. The user may provide the image of the room to color shift application 116 via a website, a color shift application 146 operating on user device 140 (described in more detail below), and/or other interface from which color shift application 116 may obtain the image.

Color shift application 116 may identify the marker automatically (e.g., via conventional image recognition techniques) and/or based on input from the user (via a user interface) that includes an indication of a location of the marker in the image (e.g., the user may circle or otherwise indicate where the marker is located).

In an operation 204, color shift application 116 may obtain pre-stored color characteristics of the identified marker. For example, color shift application 116 may query the item database to obtain the pre-stored color characteristics, which may have been previously calculated by color shift application 116 based on a reference environment or may be predefined from another entity, such as a manufacturer of the item.

In an operation 206, color shift application 116 may measure one or more color characteristics of the marker. For example, color shift application 116 may measure a color scale, a hue, a lighting intensity, and/or other color characteristics of the marker.

In an operation 208, color shift application 116 may compare the pre-stored color characteristics with the measured color characteristics using one or more image processing techniques. For example, and without limitation, color shift application may compare values in a specific color space (e.g. CMYK, CIE Lab, sRGB, etc.), compare values in black and white to determine differences in lightness, create a "color profile" (e.g., an International Color Consortium device profile), create a hash map or other mathematical function to map measured color characteristics to reference color characteristics, and/or perform other image processing techniques. In an implementation, a color shift value may therefore include a function or other mapping across a color space, which can vary according to time, three-dimensional coordinates in the environment, or other variables. In an operation 210, color shift application 116 may determine a color shift value based on the comparison. The color shift value may include multiple color shift values, each corresponding to and being used to shift a given color characteristic.

Color shift application 116 may use a color shift value in various ways. Generally, color shift application 116 may use a color shift value to simulate the effects of lighting conditions on an illuminant invariant image object or to remove the effects of lighting conditions to create an illuminant invariant image object. Specifically, color shift application 116 may use a color shift value to chain reference points so that color shift values may be determined for an environment having different sets of lighting conditions at different locations, even if a marker is known only for a subset (e.g., one or more) of the different locations.

Chaining Reference Points

In an implementation, color shift application 116 may chain together reference points in an image in order to determine and apply color shift values at various locations within an environment. For example, a first location of a room that is imaged may be affected by a first set of lighting conditions (e.g., nearby a light source) while a second location of the room may be affected by a second set of lighting conditions (e.g., another light source or resulting from being further away from the light source). Other locations of the room may be affected by other lighting conditions as well.

A reference point may include a portion (e.g., one or more pixels or other portion) of an image of an environment. Each reference point may correspond to all or portion of a discreet image object that includes an image of an object. For example, a given reference point may correspond to a particular object in an environment that may be used as a marker.

Color shift application 116 may chain together reference points starting with a reference point whose color shift value is already known for a first location (e.g., based on a marker as described above).

Figure 3:
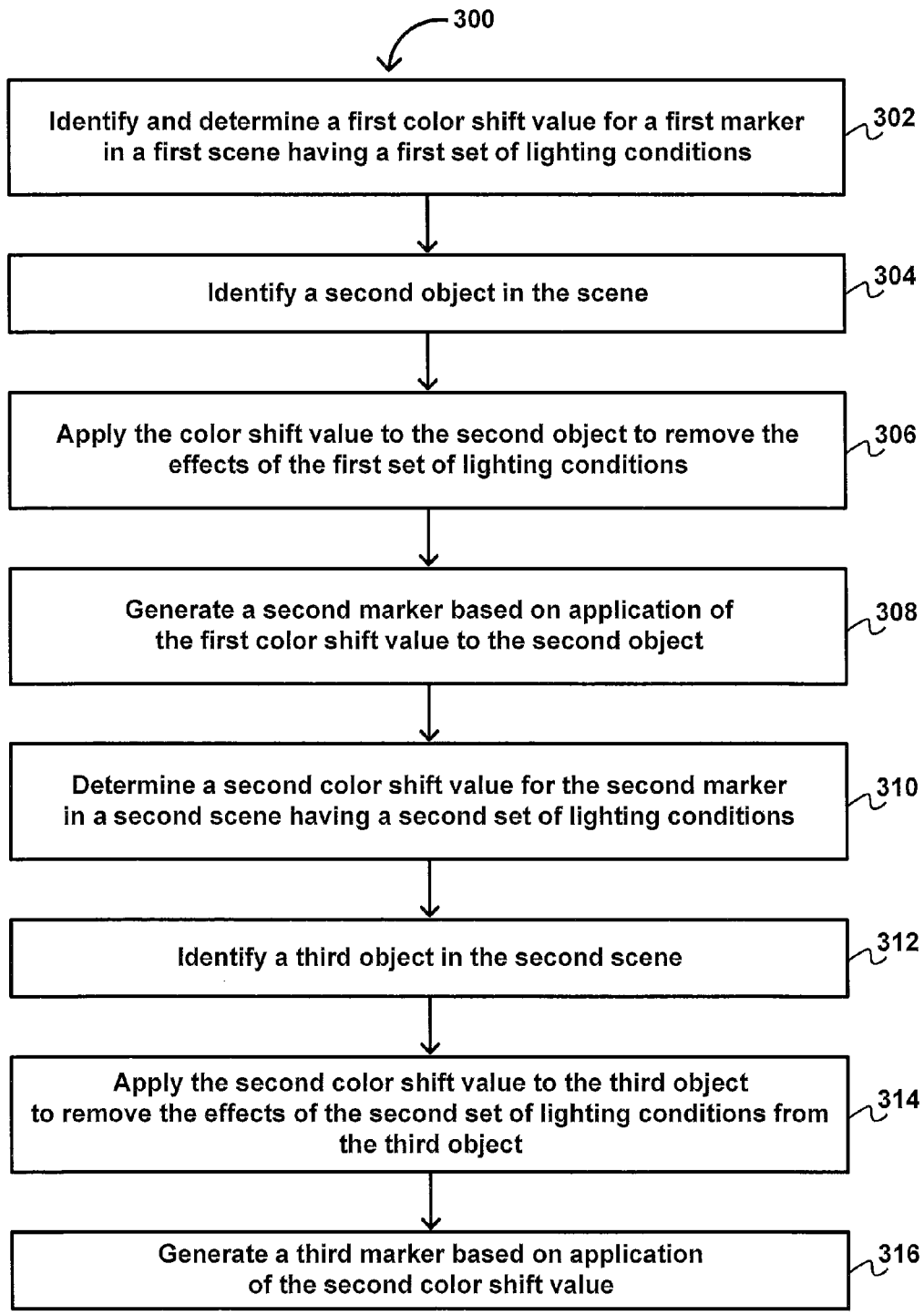
FIG. 3 illustrates a flow diagram depicting a process of chaining reference points, which are used as markers to perform color shifts, according to an implementation of the invention.

FIG. 3 illustrates a flow diagram depicting a process 300 of chaining reference points, which are used as markers to perform color shifts, according to an implementation of the invention. FIG. 3 will be described with reference to FIG. 4, which illustrates a schematic diagram depicting an image 401 of an environment having a first location 401A associated with a first set of lighting conditions, and a second location 401B associated with a second set of lighting conditions, in which a first marker 402 is used to generate a second marker 404, which is then used to generate a third marker 406, according to an implementation of the invention.

In an operation 302, color shift application 116 may identify and determine a first color shift value ($\Delta C_1$) for a first marker 402A in location 401A. For example, and without limitation, color shift application 116 may identify an object (e.g., a poster having known color characteristics), determine that the identified object corresponds to first marker 402A, and then determine first color shift value ($\Delta C_1$) using process 200 described above with respect to FIG. 2. The object may be identified using conventional image processing techniques. For example, color shift application 116 may identify the object based on a set of pixels associated with first location 401A. The set of pixels may correspond to a portion or all of an object being imaged in location 401A.

First color shift value ($\Delta C_1$) may represent the effects of the lighting conditions at first location 401A on first marker 402, resulting in the color characteristics exhibited by the first marker when placed at location 401A.

In an operation 304, color shift application 116 may identify a first image object 404A in location 401A. Image object 404A may be identified using image processing techniques, as before. In a particular example, image object 404A may include a wall on which first marker 402A is affixed. Alternatively or additionally, image object 404A may be identified based on other techniques as well. For example, color shift application 116 may receive, from a user, an indication of image object 404A. In an example in which image object 404A includes a wall, the user may specify (and color shift application 116 may receive) an area of an image that corresponds to the wall (or simply provide an image of the wall only). In this manner, color shift application 116 may assume that the area indicated (or entire image) corresponds to the wall.

In an operation 306, color shift application 116 may apply first color shift value ($\Delta C_1$) to image object 404A. For example, color shift application 116 may apply first color shift value ($\Delta C_1$) to remove the effects of the lighting conditions associated with first location 401A.

In an operation 308, color shift application 116 may generate a second marker 404 based on application of first color correction value ($\Delta C_1$) to image object 404A. In doing so, color shift application 116 may remove the effects of the lighting conditions at first location 401A from an object represented by image object 404A. As such, second marker 404 may represent how image object 404A would appear absent the effects of the lighting conditions at first location 401A.

Figure 4:
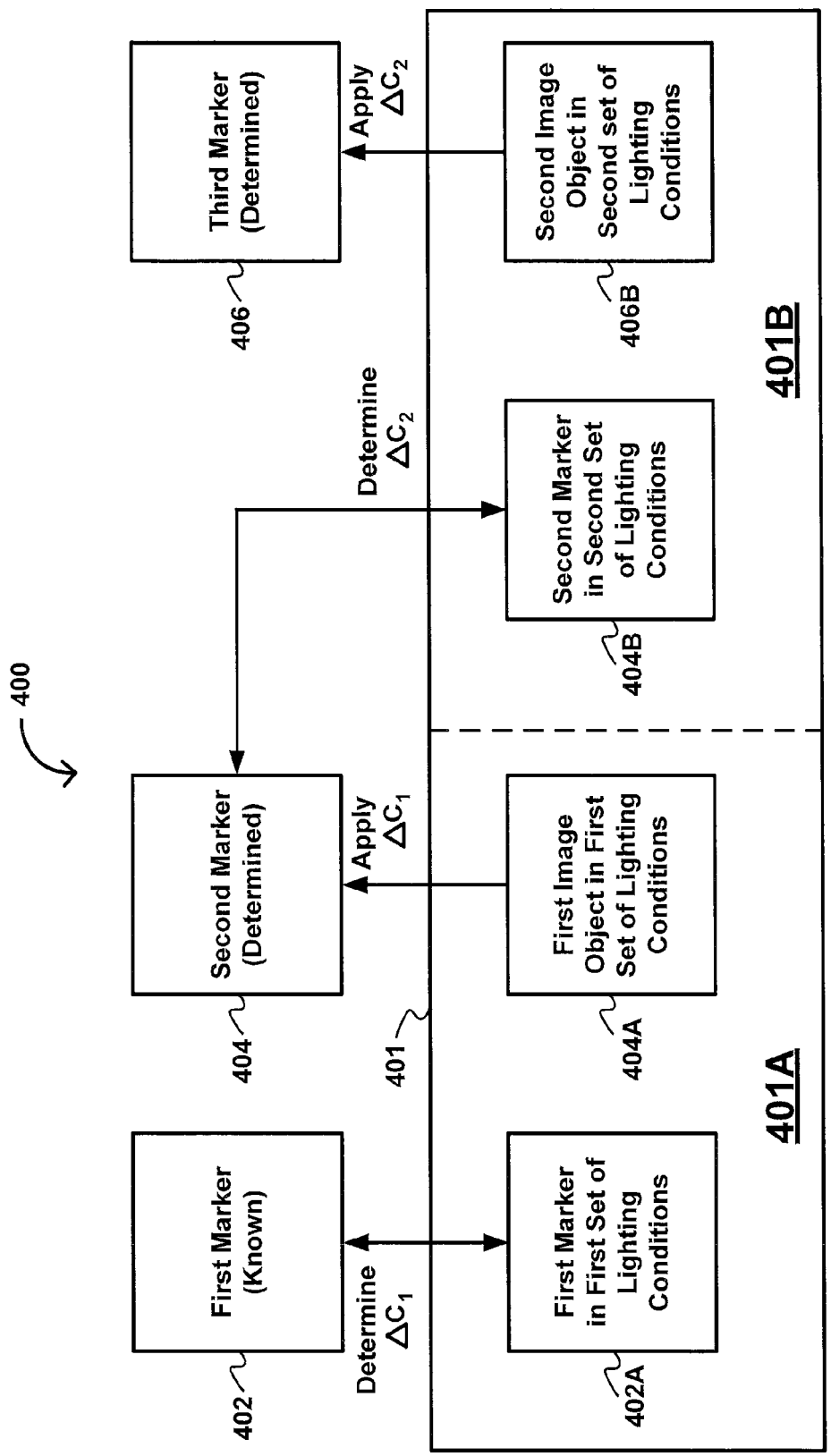
FIG. 4 illustrates a schematic diagram depicting an image of an environment having a first location associated with a first set of lighting conditions and a second location associated with a second set of lighting conditions, in which a first marker is used to generate a second marker, which is then used to generate a third marker, according to an implementation of the invention.

In an operation 310, color shift application 116 may identify and determine a second color shift value ($\Delta C_2$) for second marker 404B in location 401B. Second marker 404B represents how marker 404 would appear given the effects of the lighting conditions of location 401B. For example, color shift application 116 may determine the second color shift value ($\Delta C_2$) for second marker 404B using process 200 described above in relation to FIG. 2. Second marker 404 may appear in both locations 401A and 401B (as illustrated in FIG. 4, in the form of image object 404A in location 401A and second marker 404B in location 401B). For example, first image object 404A may represent a wall that spans two (or more) locations of a room that each is affected by a set of lighting conditions that differ from one another and therefore have different effects on objects in those locations.

Second color shift value ($\Delta C_2$) may represent the effects of the lighting conditions at second location 401B on second marker 404, resulting in the color characteristics exhibited by the second marker when placed at location 401B.

In an operation 312, color shift application 116 may identify a second image object 406B in location 401B.

In an operation 314, color shift application 116 may apply second color shift value ($\Delta C_2$) to second image object 406B.

In an operation 316, color shift application 116 may generate a third marker 406 using process 200.

Color shift application 116 may continue this process so long as an image object is available that: (i) represents an object that exists in or is placed at two or more locations, and (ii) can be used as a marker. An object may exist in or be placed at two or more locations by spanning the two or more locations (e.g., a wall that spans two or more locations) or by being placed in the two or more locations (e.g., a poster moved from one location to another location by a user) so that the object can be used as a chained reference. In this manner, color shift application 116 may determine and apply color shift values for different locations associated with different lighting conditions, so long as at least one marker is available for at least one of the lighting conditions and so long as a common object exists across any two given locations having different lighting conditions.

Determining Color Gradients

Figure 5:
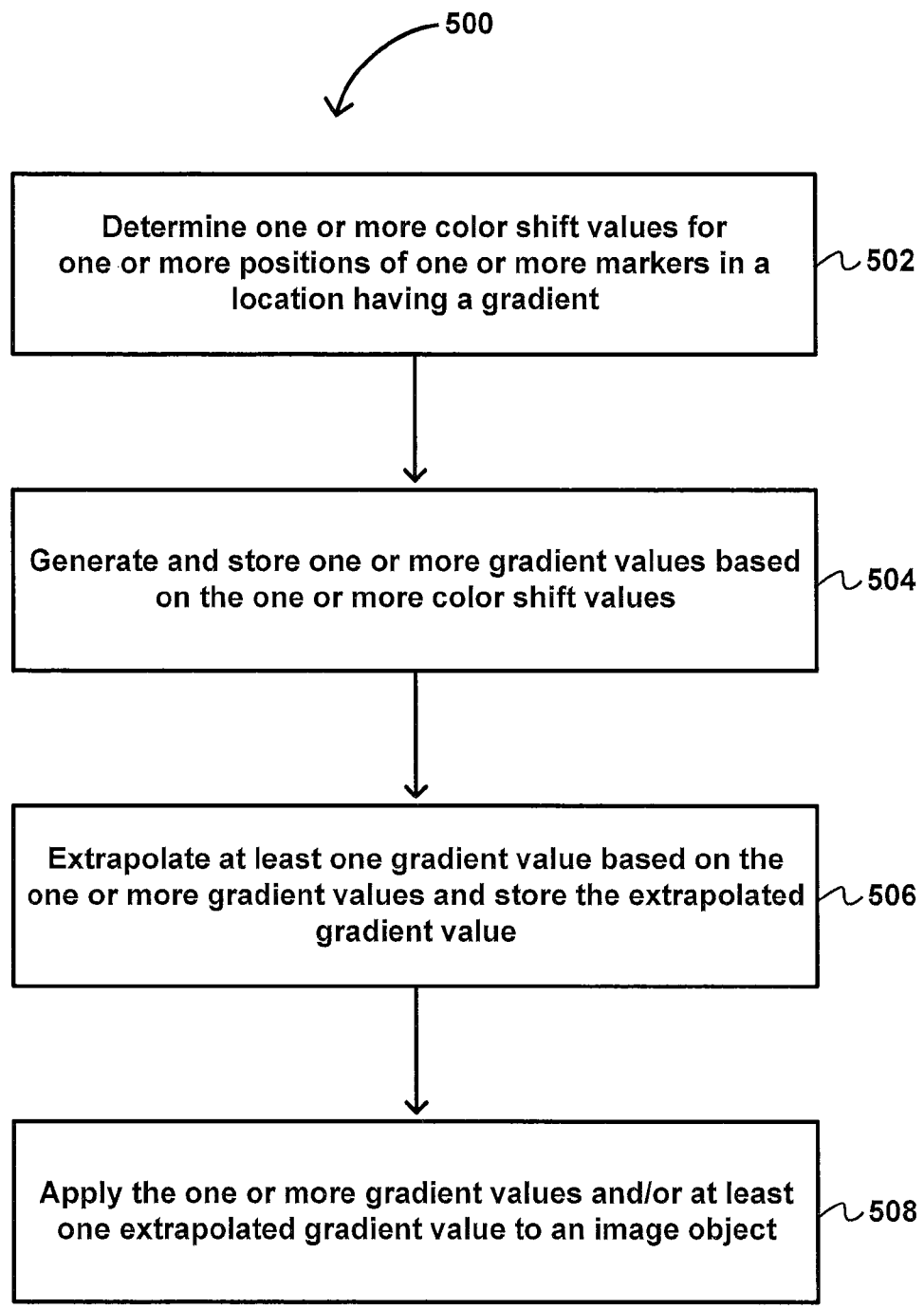
FIG. 5 illustrates a flow diagram depicting a process of determining a gradient across one or more markers in one or more locations of an environment, according to an implementation of the invention.
Figure 6:
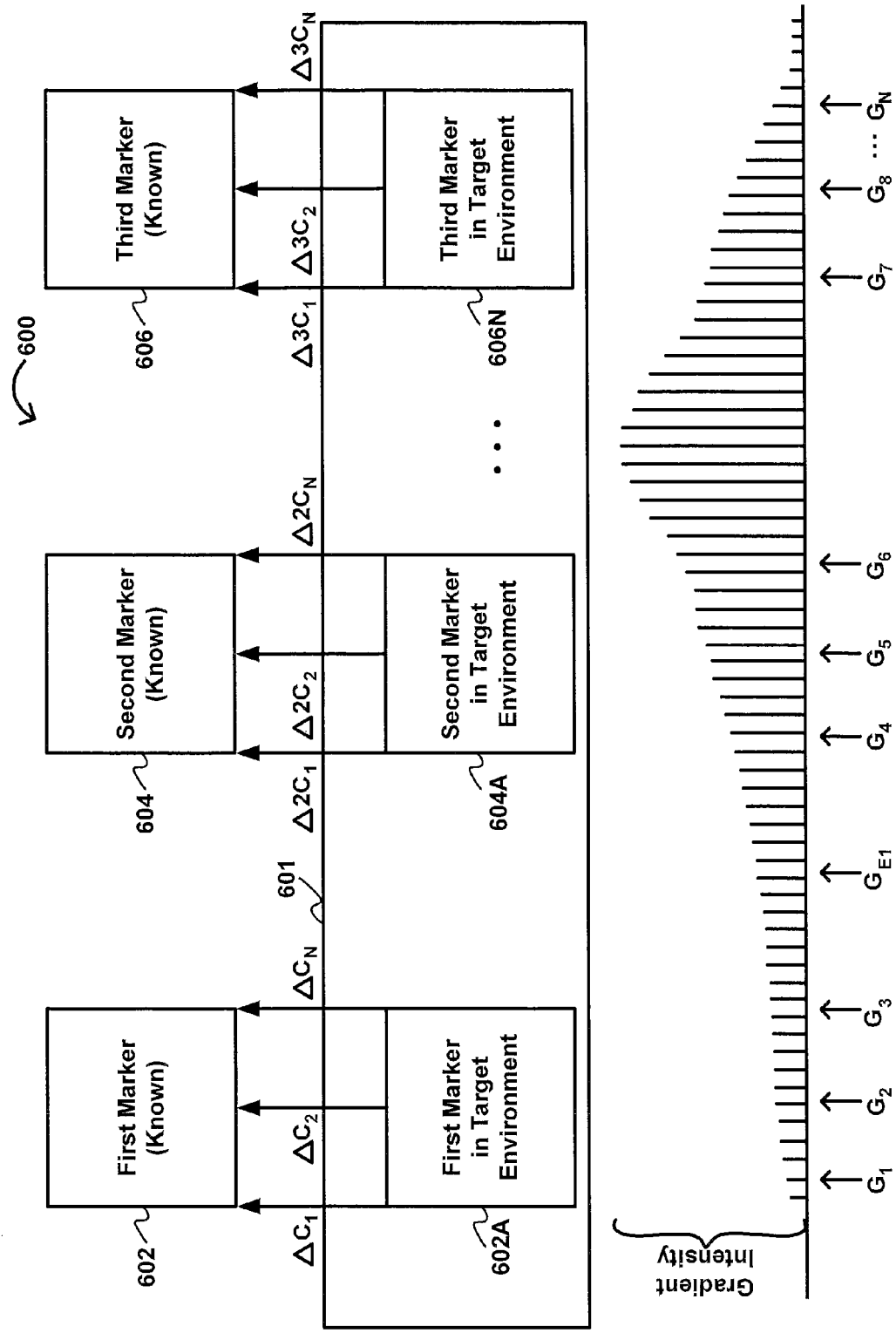
FIG. 6 illustrates a schematic diagram depicting an image an environment having a gradient of lighting conditions, according to an implementation of the invention.

FIG. 5 illustrates a flow diagram depicting a process 500 of determining a gradient across one or more markers in one or more locations of an environment, according to an implementation of the invention. FIG. 5 will be described with reference to FIG. 6, which illustrates a schematic diagram depicting an image 601 an environment having a gradient of lighting conditions, according to an implementation of the invention.

In an operation 502, color shift application 116 may determine one or more color shift values (illustrated as color shift values $\Delta C_{1,2,\ldots,n}$, $2\Delta C_{1,2,\ldots,n}$, $3\Delta C_{1,2,\ldots,n}$) for one or more positions of one or more markers (illustrated as markers 602, 604, 606) in a location having a gradient (G). Gradient (G) may include lighting conditions that vary across different locations in an environment. For example, and without limitation, gradient (G) may result from light intensity from a light source that varies as a function of distance from the light source. In the foregoing example, because multiple light sources, reflective objects, and/or absorptive objects may alter lighting conditions in a given environment, gradient (G) may include light intensities and other conditions that vary at two or more locations.

Markers 602, 604, 606 may include the same or different markers, which may include chained reference points described herein. The color shift values may be determined (e.g., using process 200) based on a difference between color characteristics of the markers 602, 604, 606 and color characteristics of these markers as observed in the environment imaged in image 601. For instance, marker 602A in image 601 represents how marker 602, as affected by the gradient (G) at the location where marker 602A is located.

In an operation 504, color shift application 116 may generate and store one or more gradient values (illustrated in FIG. 6 as $G_{1,2,3,4,5,6,7,8,\ldots,N}$) based on the one or more color shift values. A given color shift value may represent the effects of lighting conditions at a given location. As such, a corresponding gradient value may represent the gradient at the given location. For example, $\Delta C_1$ may correspond to a gradient value $G_1$, which represents the gradient at a location in the environment for which $\Delta C_1$ relates. A given gradient value may be equal to a corresponding color shift value.

In an operation 506, color shift application 116 may extrapolate at least one gradient value (illustrated in FIG. 6 as $G_{E1}$) based on one or more gradient values and store the extrapolated gradient value. For example, and without limitation, extrapolated gradient value $G_{E1}$ may be determined based on an average of two or more gradient values (e.g., $G_3$ and $G_4$) that are nearby the extrapolated gradient value, regression analysis that uses a mathematical function to describe the gradient based on one or more inputs (e.g., as x/y/z coordinates, time/date, percentage cloud cover, etc.), weighted averages based on distance, and/or other techniques. By extrapolating gradient values, color shift application 116 may more completely characterize gradient G in locations where a marker is unavailable.

In an implementation, color shift application 116 may store an indication that a given gradient value has been extrapolated so that a user (for example) may choose to use or ignore such extrapolated gradient values when applying the characterized gradient to an image object.

In an operation 508, color shift application 116 may apply the one or more gradient values and/or extrapolated gradient values to an image object. For example, as an image object is moved from one position of image 601 to another, the characterized gradient may be applied to the image object using gradient values $G_{1-n}$ and/or extrapolated gradient values to simulate the effects of the gradient on an object imaged by the image object. In this manner, a user may, for example, visualize how an object would appear in an environment that has a gradient.

Delta Maps

In an implementation, color shift application 116 may store one or more delta maps in relation to an environment. A delta map may include, for example, one or more color shift values, gradient values, a time (e.g., a time of day, month, year, etc., associated with the delta map), lighting configurations as defined by the user (e.g., spotlight on/off, halogen vs florescent bulbs, etc.), a device type or characteristics, a percentage cloud cover, etc.), and/or other information that describes the effects of lighting conditions that may be stored. As such, a given delta map may represent the effects of lighting conditions on an environment.

In an implementation, color shift application 116 may store a delta map in association with a given environment in a delta map database, such as a database 130. For example, color shift application 116 may store an identifier that identifies a user's room in association with an identifier that identifies a delta map that is used to describe the effects of lighting conditions in the room. In this manner, once color shift application 116 characterizes such effects (as described herein), a delta map corresponding to the effects may be stored in association with the environment for later recall. Thus, color shift application 116 may provide a visualization of how an object would look under the lighting conditions of the user's room without having to re-characterize the user's room each time. In operation, a user may, for example, login to the system or otherwise provide identification information that allows the system to recall a delta map corresponding to the user's room.

In an implementation, color shift application 116 may update a given delta map as appropriate. For example, if additional measurements, color shift values, gradient values, etc., are obtained in association with a given environment, color shift application 116 update any delta map that is associated with that environment.

Figure 7:
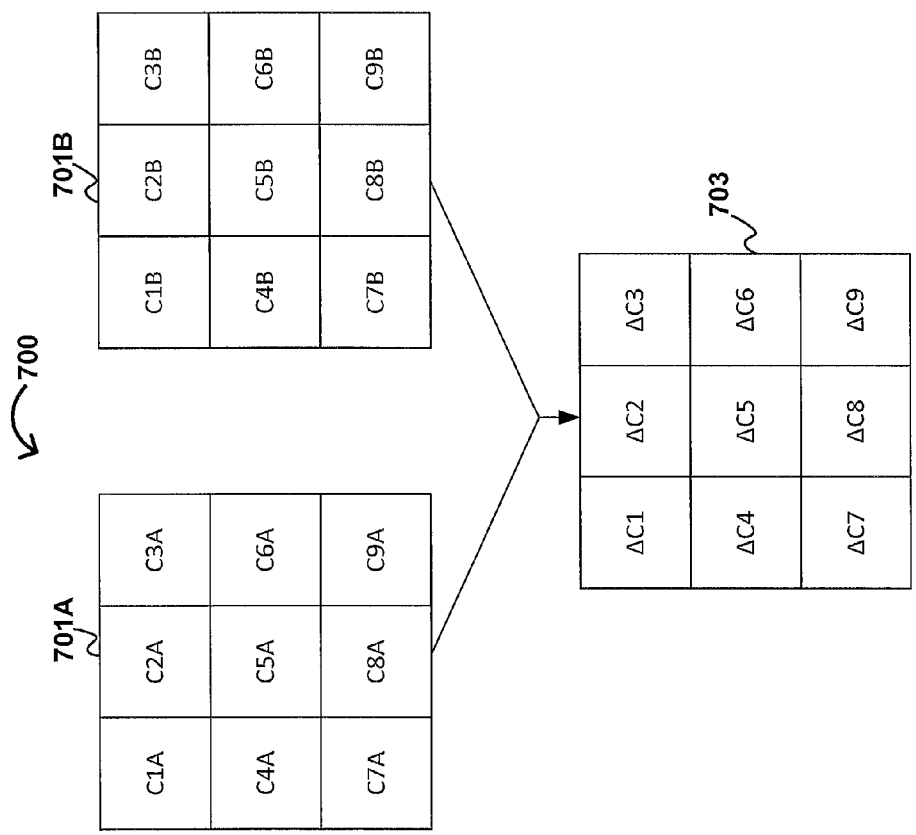
FIG. 7 illustrates a schematic diagram depicting a delta map generated for an environment, according to an implementation of the invention.

FIG. 7 illustrates a schematic diagram 700 depicting a delta map 703 generated based on color values of one or more markers in a reference environment 701A and colors values of the one or more markers in a target environment 701B, according to an implementation of the invention.

Various color values C1A-C9A may be known in relation to a reference environment 701A. For instance, the color values C1A-C9A may include reference points from one or more markers that were imaged in reference environment 701A having known lighting conditions. In other words, as illustrated, C1A-C9A represents color characteristics of objects imaged in an environment having known lighting conditions.

The one or more markers may be imaged in a target environment 701B and have associated color values C1B-C9B. In other words, as illustrated, C1B-C9B represents color characteristics of objects imaged in an environment having unknown lighting conditions. A comparison of the color values C1A-C9A with corresponding color values C1B-C9B may yield a series of respective color shift values ΔC1-ΔC9. For instance, comparing color characteristic C1A and C1B may yield color shift value ΔC1. Likewise, comparing color characteristic C2A and C2B may yield color shift value ΔC2, and so on. By repeating this process for various reference points, a delta map 703 may be generated, which may characterize the effects of lighting conditions of target environment 701B relative to reference environment 701A. In other words, delta map 703 may be used to characterize the lighting conditions at various locations of an environment.

User Device 140

User device 140 may include one or more processors 142, one or more storage devices 144, and/or other components. Processor(s) 142 may be programmed by one or more computer program instructions, which may be stored in storage device(s) 144. The one or more computer program instructions may include a color shift application 146 and/or other instructions. Color shift application 146 may include some or all of the instructions described above with respect to color shift application 116. As such, user device 140 may be programmed to perform some or all of the functions of computer system 110.

Computer system 110 and user devices 140 may each include, without limitation, server devices (e.g., server blades), desktop computers, laptop computers, tablet computers, mobile computers (e.g., smartphones), dedicated media player devices, and/or device that may be programmed with the various computer program instructions described herein.

Although illustrated in FIG. 1 as a single component, computer system 110 may include a plurality of individual components (e.g., computer devices) each programmed with at least some of the functions described herein. In this manner, some components of computer system 110 may perform some functions while other components may perform other functions, as would be appreciated. The one or more processors 112 may each include one or more physical processors that are programmed by computer program instructions. The various instructions described herein are exemplary only. Other configurations and numbers of instructions may be used, so long as the processor(s) 112 are programmed to perform the functions described herein.

Furthermore, it should be appreciated that although the various instructions are illustrated in FIG. 1 as being co-located within a single processing unit, in implementations in which processor(s) 112, 142 includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 112, 142 may be programmed by one or more additional instructions that may perform some or all of the functionality attributed herein to one of the instructions.

The various instructions described herein may be stored in a storage device 114, 144 which each may comprise random access memory (RAM), read only memory (ROM), and/or other memory. The storage device may store the computer program instructions (e.g., the aforementioned instructions) to be executed by processor 112, 142 as well as data that may be manipulated by processor 112, 142. The storage device may comprise floppy disks, hard disks, optical disks, tapes, or other storage media for storing computer-executable instructions and/or data.

The various components illustrated in FIG. 1 may be coupled to at least one other component via network 102, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1 and other drawing Figures, different numbers of entities than depicted may be used. Furthermore, according to various implementations, the components described herein may be implemented in hardware and/or software that configure hardware.

The various databases 130 described herein may be, include, or interface to, for example, an Oracle™ relational database sold commercially by Oracle Corporation, MySQL, SYBASE, Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer implemented method of adjusting color characteristics of image objects in association with an image of an environment, the environment having at least a first location having a first set of lighting conditions and a second location having a second set of lighting conditions, the method being implemented by a computer system having one or more physical processors programmed by computer program instructions that, when executed by the one or more physical processors, program the computer system to perform the method, the method comprising:

identifying, by the computer system, a first marker in the first location, the first marker having a set of known color characteristics under known lighting conditions;

obtaining, by the computer system, a set of measured color characteristics of the first marker in the first location, the set of measured color characteristics being representative of effects of the first set of lighting conditions on the first marker;

comparing, by the computer system, the set of known color characteristics with the set of measured color characteristics;

determining, by the computer system, a first color shift value based on the comparison, wherein the first color shift value represents a difference between the known lighting conditions and the first set of lighting conditions;

identifying, by the computer system, a reference, different from the first marker, that exists in both the first location and the second location;

obtaining, by the computer system, a second set of measured color characteristics of the reference in the first location, the set of measured color characteristics being representative of effects of the first set of lighting conditions on the reference; and adjusting, by the computer system, the second set of measured color characteristics based on the first color shift value, wherein adjusting the second set of measured color characteristics removes the effects of the first set of lighting conditions to generate an illuminant invariant version of the reference.

2. The method of claim 1, the method further comprising:
obtaining, by the computer system, an image of an object not in the first location, the object having a set of color characteristics;
adjusting, by the computer system, the set of color characteristics of the object based on the first color shift value; and
generating, by the computer system, a simulated image of the object in the first location based on the adjusted set of color characteristics of the object to simulate the effects of the first set of lighting conditions on the object.

3. The method of claim 1, the method further comprising:
identifying, by the computer system, an object in the first location;
determining, by the computer system, a set of color characteristics of the object in the first location;
adjusting, by the computer system, the set of color characteristics based on the first color shift value; and
generating, by the computer system, a simulated image of the object that removes the effects of the first set of lighting conditions from the object.

4. The method of claim 1, the method further comprising:
obtaining, by the computer system, a third set of measured color characteristics of the reference in the second location, the third set of measured color characteristics being representative of effects of the second set of lighting conditions on the reference;
comparing, by the computer system, the adjusted second set of measured color characteristics with the third set of measured color characteristics;
determining, by the computer system, a second color shift value based on the comparison of the adjusted second set of measured color characteristics with the third set of measured color characteristics, wherein the second color shift value represents a difference between the first set of lighting conditions and the second set of lighting conditions.

5. The method of claim 4, the method further comprising:
identifying, by the computer system, an object in the second location;
determining, by the computer system, a set of color characteristics of the object in the second location;
adjusting, by the computer system, the set of color characteristics based on the second color shift value; and
generating, by the computer system, a simulated image of the object that removes the effects of the second set of lighting conditions from the object.

6. The method of claim 4, the method further comprising:
determining, by the computer system, a first light intensity at the first location based on the first color shift value;
determining, by the computer system, a second light intensity at the second location based on the second color shift value;

determining, by the computer system, a light gradient of the environment based on the first light intensity and the second light intensity.

7. The method of claim 6, the method further comprising:
obtaining, by the computer system, an image of an object not in the environment, the object having a set of color characteristics;
adjusting, by the computer system, the set of color characteristics of the object based on the light gradient and a location at which the object is to be placed in the environment; and
generating, by the computer system, a first simulated image of the object based on the light gradient and a location at which the object is to be located and a second simulated image of the object based on the light gradient and another location at which the object is to be located to simulate the light gradient on the object as the object is moved from one location of the environment to another location of the environment.

8. The method of claim 6, the method further comprising:
extrapolating, by the computer system, a third light intensity at a third location of the environment based on the light gradient.

9. The method of claim 6, the method further comprising:
obtaining, by the computer system, identification information that identifies the environment;
storing, by the computer system in a memory, the light gradient in association with the identification information;
receiving, by the computer system, a request to simulate an appearance of an object in the environment, the request comprising the identification information;
obtaining, by the computer system from the memory, the light gradient; and
applying, by the computer system, the light gradient to the object.

10. A system of adjusting color characteristics of image objects in association with an image of an environment, the environment having at least a first location having a first set of lighting conditions and a second location having a second set of lighting conditions, the system comprising:
a computer system comprising one or more physical processors programmed by computer program instructions, stored on a non-transitory computer readable medium, that, when executed by the one or more physical processors, program the computer system to:
identify a first marker in the first location, the first marker having a set of known color characteristics under known lighting conditions;
obtain a set of measured color characteristics of the first marker in the first location, the set of measured color characteristics being representative of effects of the first set of lighting conditions on the first marker;
compare the set of known color characteristics with the set of measured color characteristics;
determine a first color shift value based on the comparison, wherein the first color shift value represents a difference between the known lighting conditions and the first set of lighting conditions; identify a reference, different from the first marker, that exists in both the first location and the second location;
obtain a second set of measured color characteristics of the reference in the first location, the set of measured color characteristics being representative of effects of the first set of lighting conditions on the reference; and
adjust the second set of measured color characteristics based on the first color shift value, wherein the adjustment of the second set of measured color characteristics removes the effects of the first set of lighting conditions to generate an illuminant invariant version of the reference.

11. The system of claim 10, wherein the computer system is further programmed to:
obtain an image of an object not in the first location, the object having a set of color characteristics;
adjust the set of color characteristics of the object based on the first color shift value; and
generate a simulated image of the object in the first location based on the adjusted set of color characteristics of the object to simulate the effects of the first set of lighting conditions on the object.

12. The system of claim 10, wherein the computer system is further programmed to:
identify an object in the first location;
determine a set of color characteristics of the object in the first location;
adjust the set of color characteristics based on the first color shift value; and
generate a simulated image of the object that removes the effects of the first set of lighting conditions from the object.

13. The system of claim 10, wherein the computer system is further programmed to:
obtain a third set of measured color characteristics of the reference in the second location, the third set of measured color characteristics being representative of effects of the second set of lighting conditions on the reference;
compare the adjusted second set of measured color characteristics with the third set of measured color characteristics;
determine a second color shift value based on the comparison of the adjusted second set of measured color characteristics with the third set of measured color characteristics, wherein the second color shift value represents a difference between the first set of lighting conditions and the second set of lighting conditions.

14. The system of claim 13, wherein the computer system is further programmed to:
identify an object in the second location;
determine a set of color characteristics of the object in the second location;
adjust the set of color characteristics based on the second color shift value; and
generate a simulated image of the object that removes the effects of the second set of lighting conditions from the object.

15. The system of claim 13, wherein the computer system is further programmed to:
determine a first light intensity at the first location based on the first color shift value;
determine a second light intensity at the second location based on the second color shift value;
determine a light gradient of the environment based on the first light intensity and the second light intensity.

16. The system of claim 15, wherein the computer system is further programmed to:
obtain an image of an object not in the environment, the object having a set of color characteristics;
adjust the set of color characteristics of the object based on the light gradient and a location at which the object is to be placed in the environment; and
generate a first simulated image of the object based on the light gradient and a location at which the object is to be located and a second simulated image of the object based on the light gradient and another location at which the object is to be located to simulate the light gradient on the object as the object is moved from one location of the environment to another location of the environment.

17. The system of claim 15, wherein the computer system is further programmed to: extrapolate a third light intensity at a third location of the environment based on the light gradient.

18. The system of claim 15, wherein the computer system is further programmed to:
obtain identification information that identifies the environment;
store, in a memory, the light gradient in association with the identification information; receive a request to simulate an appearance of an object in the environment, the request comprising the identification information;
obtain, from the memory, the light gradient; and apply the light gradient to the object.

19. The method of claim 1, wherein identifying the reference comprises:
receiving, by the computer system, from a user, an input that specifies an area of the image of the environment that corresponds to the reference.

20. The method of claim 19, wherein the environment comprises a room, the area specified by the input corresponds to a wall in the room, and the first location corresponds to a first portion of the wall in the room and the second location corresponds to a second portion of the wall in the room.

21. A computer implemented method of identifying a gradient in an environment having at least a first location having a first set of lighting conditions and a second location having a second set of lighting conditions, wherein the gradient indicates lighting conditions that vary across the environment, the method being implemented by a computer system having one or more physical processors programmed by computer program instructions that, when executed by the one or more physical processors, program the computer system to perform the method, the method comprising:
identifying, by the computer system, a first marker in the first location;
determining, by the computer system, a first color shift value based on the first marker in the first location;
determining, by the computer system, based on the first color shift value, a first gradient value for the first location;
identifying, by the computer system, a second marker in the second location;
determining, by the computer system, a second color shift value based on the first marker in the first location;
determining, by the computer system, based on the second color shift value, a second gradient value for the second location;
generating, by the computer system, a gradient for the environment based on the first gradient value and the second gradient value.

22. The method of claim 21, the method further comprising:
extrapolating, by the computer system, a third gradient value for a third location based on the first gradient value and the second gradient value, wherein the gradient includes the third gradient.

23. The method of claim 21, the method further comprising:

identifying, by the computer system, a first image object, which is an image of a first object, to add to an image of the environment to simulate an appearance of the first object in the environment;

applying, by the computer system, the first gradient value to the first image object to simulate the effects of the gradient at the first location on the first image object; and adding, by the computer system, the first image object with the applied first gradient value to the image of the environment corresponding to the first location.

24. The method of claim 23, the method further comprising:

receiving, by the computer system, an indication to move the first image object to a location on the image corresponding to the second location;

moving, by the computer system, the first image object from the image of the environment corresponding to the first location to a location on the image corresponding to the second location of the environment;

applying, by the computer system, the second gradient value to the first image object to simulate the effects of the gradient at the second location on the first image object.

25. The method of claim 24, wherein applying the second gradient value comprises removing the effects of the first gradient value from the first image object.

26. The method of claim 21, wherein the first marker is associated with a set of known color characteristics in a known set of lighting conditions, and wherein determining the first color shift value comprises:

comparing, by the computer system, the set of known color characteristics with a set of measured color characteristics associated with the first location, wherein the first location is associated with a first set of lighting conditions; and determining, by the computer system, the first color shift value based on the comparison, wherein the first color shift value represents a difference between the known lighting conditions and the first set of lighting conditions.

* * * * *